US012697282B2

(12) United States Patent
Umstead et al.

(10) Patent No.: US 12,697,282 B2
(45) Date of Patent: Aug. 4, 2026

(54) HIGH-THROUGHPUT AUTOMATED RECONSTITUTION OF LYOPHILIZED DRUG PRODUCT

(71) Applicant: AMGEN Inc., Thousand Oaks, CA (US)

(72) Inventors: Russell Blake Umstead, Thousand Oaks, CA (US); Nicholas Guziewicz, Somerville, MA (US)

(73) Assignee: AMGEN INC., Thousand Oaks, CA (US)

( * ) Notice: Subject to any disclaimer, the term of this patent is extended or adjusted under 35 U.S.C. 154(b) by 119 days.

(21) Appl. No.: 18/275,532

(22) PCT Filed: Feb. 1, 2022

(86) PCT No.: PCT/US2022/014654

§ 371 (c)(1),
(2) Date: Aug. 2, 2023

(87) PCT Pub. No.: WO2022/169725

PCT Pub. Date: Aug. 11, 2022

(65) Prior Publication Data

US 2024/0115462 A1    Apr. 11, 2024

Related U.S. Application Data

(60) Provisional application No. 63/145,226, filed on Feb. 3, 2021.

(51) Int. Cl.
*A61J 1/20*         (2006.01)
*A61J 1/16*         (2023.01)
(Continued)

(52) U.S. Cl.
CPC ............... *A61J 1/2003* (2015.05); *A61J 1/16* (2013.01); *B01J 19/004* (2013.01); *B25J 9/1666* (2013.01);
(Continued)

(58) Field of Classification Search
CPC   A61J 1/2003; A61J 1/16; B01J 19/004; B01J 2219/00313; B01J 2219/00351; B01J 2219/00691; B25J 9/1666
(Continued)

(56) References Cited

U.S. PATENT DOCUMENTS 9,943,464 B2 *   4/2018   Parviainen ............ A61J 1/2096
2009/0004063 A1   1/2009   Higashihara et al.
(Continued)

FOREIGN PATENT DOCUMENTS

EP          2042232 A1      4/2009

OTHER PUBLICATIONS

International Search Report for Application No. PCT/US2022/014654 dated May 16, 2022.
(Continued)

*Primary Examiner* — Christopher M Afful
(74) *Attorney, Agent, or Firm* — MARSHALL, GERSTEIN & BORUN LLP

(57)          ABSTRACT

A drug product reconstitution processing system includes a drug vial tray having a plurality of walls, a first robotic arm movable between a plurality of positions above the drug vial tray, and a second robotic arm movable between a plurality of positions above the drug vial tray. The first robotic arm includes a drug vial transfer system adapted to retrieve a drug vial disposed within one of the plurality of wells and a vial agitation system adapted to agitate the drug product contained within the drug vial. The second robotic arm includes a drug vial reconstitution system adapted to selec-
(Continued)

tively add a fluid to the drug vial and/or remove a fluid from the drug vial.

14 Claims, 10 Drawing Sheets

(51) Int. Cl.
B01J 19/00 (2006.01)
B25J 9/16 (2006.01)
(52) U.S. Cl.
CPC ................. *B01J 2219/00313* (2013.01); *B01J 2219/00351* (2013.01); *B01J 2219/00691* (2013.01)
(58) Field of Classification Search
USPC .......................................... 141/279
See application file for complete search history.

(56) References Cited

U.S. PATENT DOCUMENTS

| | | | | |
|---|---|---|---|---|
| 2013/0325030 A1* | 12/2013 | Hourtash | .............. | B25J 9/1676 |
| | | | | 606/130 |
| 2014/0157731 A1* | 6/2014 | Perazzo | ................. | B65B 3/003 |
| | | | | 141/2 |
| 2015/0210410 A1* | 7/2015 | Umeno | ................. | A61J 1/2096 |
| | | | | 53/51 |
| 2015/0335531 A1* | 11/2015 | Yuyama | ................... | A61J 1/20 |
| | | | | 141/18 |

OTHER PUBLICATIONS

Written Opinion for Application No. PCT/US2022/014654 dated May 16, 2022.

* cited by examiner

131a

172a — Set arm movement speed to "high"

172

172b — Move first robotic arm to location above desired well

172c — Set arm movement speed to "low"

172d — Move first robotic arm to lowered position

172e — Open grasping member

172f — Move first robotic arm to "raised" location

131c

192a

131d

Wait for current program to complete execution

192b

Set arm movement speed to "high"

192c

Move first or second robotic arm to "safe" position

HIGH-THROUGHPUT AUTOMATED RECONSTITUTION OF LYOPHILIZED DRUG PRODUCT

CROSS-REFERENCE TO RELATED APPLICATION

This is the United States national phase of International Patent Application No. PCT/US2022/014654, filed Feb. 1, 2022, which claims priority to U.S. Provisional Patent Application No. 63/145,226, filed Feb. 3, 2021, the entire contents of each of which are hereby expressly incorporated herein by reference.

FIELD OF DISCLOSURE

The present disclosure generally relates to drug delivery systems, and, more particularly, to approaches for automated reconstitution of drug product.

BACKGROUND

Drugs are administered to treat a variety of conditions and diseases. These drug dosings may be performed in a health-care facility, or in some instances, at remote locations such as a patient's home. In certain applications, a drug product may be shipped to a healthcare facility (e.g., an inpatient facility, an outpatient facility, and/or a pharmacy) in a powdered or lyophilized form or alternatively in a liquid form.

When reconstituting these drugs for administration, it is desirable to maintain a clean and/or sterile environment so as to not taint or otherwise damage the quality of the drug or otherwise impact development. Additionally, some classes of drugs such as bi-specific T-cell engagers may require exceptionally accurate quantities of the drug product and/or other fluids required for dosing. Oftentimes, the healthcare professional must prepare the drug by closely following a set of steps to ensure a sterile environment is maintained and that correct quantities of ingredients are added to the delivery container. As a result, the reconstitution process may be time-consuming, tedious, and may have an unacceptable or undesirable error rate. Development of robotic based analytical workflows for lyophilized drug products has resulted in a reduction of time and labor intensive sample preparation tasks in addition to the mitigation of safety concerns such as exposure to needles during drug reconstitution. These new workflows may reconstitute lyophilized samples autonomously or semi-autonomously, extract the samples from sealed containers, and/or perform sample preparation steps such as dispensing samples into a microwell plate for measuring protein concentrations, each with minimal or no manual intervention.

In these existing approaches, a number of steps must be either performed manually or via additional components that require the delivery container to be moved to a separate workstation. For example, in some approaches, to agitate and/or mix the contents of the delivery container, the system incorporated an on-deck vortexer, which oftentimes resulted in increased processing times.

As described in more detail below, the present disclosure sets forth systems and methods for using a robotic-based reconstitution system embodying advantageous alternatives to existing systems and methods, and that may address one or more of the challenges or needs mentioned herein, as well as provide other benefits and advantages.

SUMMARY

In accordance with a first aspect, a drug reconstitution processing system includes a drug vial tray having a plurality of walls, a first robotic arm movable between a plurality of positions above the drug vial tray, and a second robotic arm movable between a plurality of positions above the drug vial tray. The first robotic arm includes a drug vial transfer system adapted to retrieve a drug vial disposed within one of the plurality of wells and a vial agitation system adapted to agitate the drug product contained within the drug vial. The second robotic arm includes a drug vial reconstitution system adapted to selectively add a fluid to the drug vial and/or remove a fluid from the drug vial.

In some examples, the agitation system includes at least one motor, a memory configured to store non-transitory computer executable instructions, and a processor configured to interface with the memory. The processor is configured to execute the non-transitory computer executable instructions to cause the processor to initiate the at least one motor to move according to an agitation routine. In some examples, the agitation routine may include moving the drug vial in a lateral direction, moving the drug vial in an axial direction, and rotating the drug vial about an axis.

In some approaches, the drug transfer system includes at least one motor, a memory configured to store non-transitory computer executable instructions, and a processor configured to interface with the memory. The processor is configured to execute the non-transitory computer executable instructions to cause the processor to initiate the at least one motor to move to transfer the drug vial to a different one of the plurality of wells.

In some examples, the system further includes a collision detection system. The collision detection system is adapted to identify whether the first robotic arm will contact the second robotic arm in response to a command to move the first robotic arm or the second robotic arm. The collision detection system is adapted to compare a desired movement location of the first robotic arm or the second robotic arm with a location of the second robotic arm or the first robotic arm, respectively.

In some of these approaches, the vial agitation system and the drug vial reconstitution system may operate concurrently.

In accordance with a second aspect, a drug reconstitution processing system includes a drug vial tray having a plurality of wells, a first robotic arm movable between a plurality of positions above the drug vial tray, a second robotic arm movable between a plurality of positions above the drug vial tray, a memory adapted to store non-transitory computer executable instructions, and a processor adapted to interface with the memory. Each of the plurality of wells is adapted to retain a drug vial including a drug product. The first robotic arm includes a drug vial transfer system adapted to move a drug vial between a desired well of the plurality of wells. The second robotic arm includes a drug vial reconstitution system adapted to selectively add a fluid to the drug vial and/or remove a fluid from the drug vial. Upon receiving a command to initiate the drug vial transfer system or the drug vial reconstitution system, the processor is adapted to execute the non-transitory computer executable instructions to cause the processor to initiate a collision detection system.

In accordance with a third aspect, a computer-implemented approach for reconstituting a drug product is carried out by an automated drug product reconstitution processing system. The approach includes receiving, at the automated drug reconstitution processing system, an instruction to execute a command. Location data corresponding to a location of a first robotic arm, a second robotic arm, and a desired location of the first or the second robotic arm based on the received command is received at the automated drug processing system. A collision detection system automatically determines whether the first robotic arm will contact the second robotic arm upon executing the command. In response to determining whether the first and second robotic arms will contact each other upon executing the command, the approach selectively executes the command or initiates a collision avoidance routine.

BRIEF DESCRIPTION OF THE DRAWINGS

The above needs are at least partially met through provision of the approaches for high-throughput automated reconstitution of drug product described in the following detailed description, particularly when studied in conjunction with the drawings, wherein.

Figure 1:
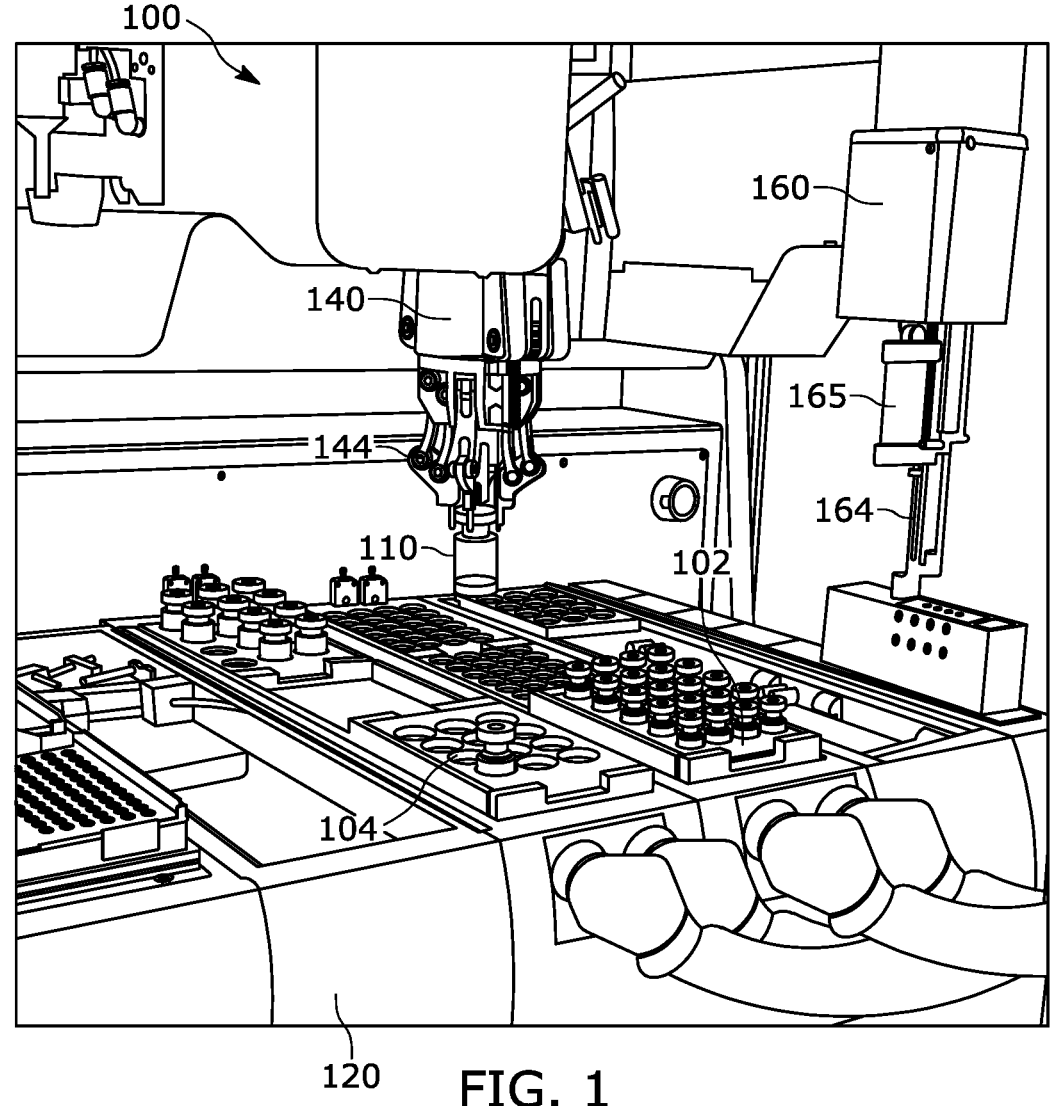
FIG. 1 illustrates an example drug product processing system in accordance with various embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, an automated high-throughput approach for a robotic liquid handling platform for reconstituting lyophilized drug product is provided. The lyophilized drug product may be provided in a sealed vial. The approaches described herein include implementation of new computer-implemented processes to enable new robotic tasks. For example, the system may incorporate a collision detection system and systems to enable parallel processing of multiple vials. More specifically, in some examples, a first robotic arm may perform steps of drug reconstitution, while a second robotic arm may simultaneously or concurrently perform the steps of mixing, agitating, and/or moving the drug product vial to a different location.

Turning to the figures, pursuant to these various embodiments, a drug reconstitution system 100 is provided that includes a drug vial tray or trays 102, a computing system 120, a first robotic arm 140, and a second robotic arm 160. Generally speaking, the drug vial tray 102 includes a number of wells 104 to receive and retain a corresponding number of drug vials 110 to be processed by the system 100. It is appreciated that the drug reconstitution system 100 provided herein is but one example of such a system. The drug reconstitution system 100 may reconstitute, extract, and/or process a large number (e.g., 60) of drug vials 110 every hour, and in some examples, can actively perform sample preparation steps such as dispensing samples into a microwell plate for measuring sample protein concentrations at a similarly high rate.

The drug vial 110 may be in the form of a prefilled container and includes a vial body defining an inner volume. In some examples, the drug vial 110 may also include a vial adapter (not illustrated) used to releasably couple with other components (e.g., a drug delivery container, a syringe, a drug delivery device, etc.). The inner volume may be sterile. In some examples, the vial adapter may also be a CSTD that mates, engages, and/or couples to other adapters such as, for example, a delivery container adapter (not illustrated).

The inner volume of the drug vial 110 contains a predetermined quantity of drug product or active pharmaceutical ingredient ("API") (e.g., between approximately 2 mcg and approximately 100 mcg), depending on the BiTE and vial size, which, in the illustrated example, is in powdered form (i.e., lyophilized) requiring reconstitution. In other examples, the drug product may be in liquid form and may not require reconstitution. Nonetheless, the system 100 includes an accurate quantity of drug product, and thus does not require the need to add additional quantities thereto in a sterile environment.

In some examples, the API may be in the form of a half-life extended ("HLE") BiTE and/or an IV-admin monoclonal antibody ("mAbs") as desired. These HLE BiTEs include an antibody Fc region that advantageously provides different drug properties such as longer and extended half-lives. Accordingly, such APIs may be preferred due to their ability to maintain protective levels in the patient for relatively longer periods of time. Nonetheless, in other examples, the API may be in the form of a canonical-BiTE that is to be administered in a professional healthcare environment.

The fluid reservoir may contain and/or dispense a predetermined quantity of reconstituting fluid or diluent (e.g., preservative-free water for injection or "WFI"; between approximately 0.1 mL and approximately 10 mL) to be added to the prefilled drug vial 110 for reconstitution of the drug product. In some examples, a benzyl alcohol preserved (or any other preservative) WFI may be used.

Figure 2:
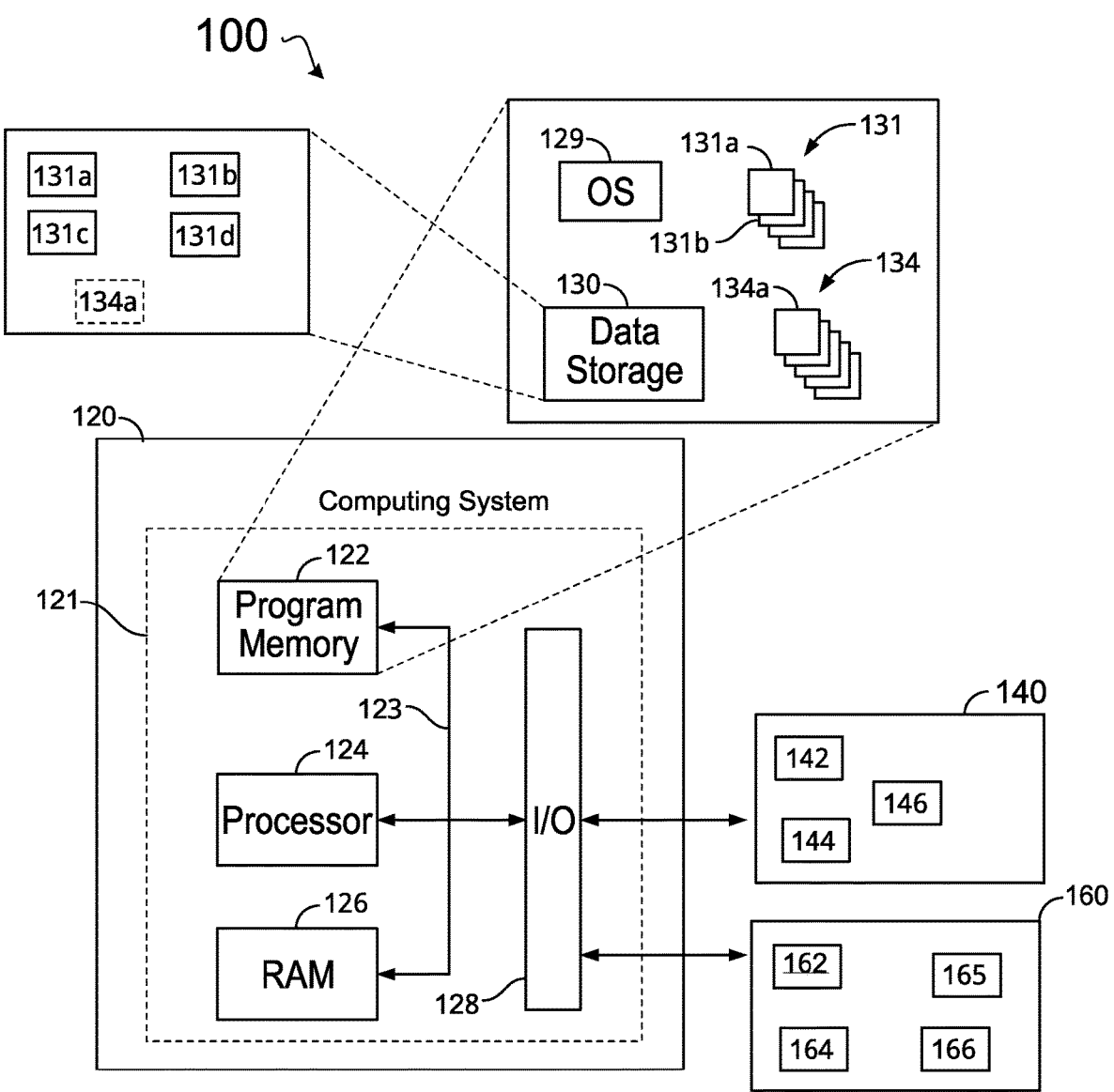
FIG. 2 illustrates a block diagram of the example drug product processing system of FIG. 1 in accordance with various embodiments.

The robotic arms 140, 160 are movable between a number of positions within the confines of a three-dimensional area such as, for example, a raised position that is spatially removed from the drug vial tray(s) 102 and/or drug vials 110, and a lowered position that is adjacent to the drug vial tray(s) 102 and/or the drug vials 110. In the illustrated example, the first robotic arm 140 is used to transfer and/or move the drug vial 110 to different wells 104 of the drug vial tray 102. More specifically, as illustrated in the schematic of FIG. 2, the first robotic arm 140 includes any number of motors 142, a grasping member or claw 144, and an arm position sensor 146. The first robotic arm 140 is responsive to a set of instructions or commands to initiate and execute a drug vial transfer system and a vial agitation system. The motor or motors 142 move the first robotic arm 140 in the three dimensional space defined by the system 100, and further move the grasping member 144 towards a desired drug vial 110 and cause the grasping member 144 to grab the drug vial 110, lift the vial 110 from the well 104, and move the drug vial 110 to a different well. Further, as will be discussed in detail below, the motor or motors 142 may perform steps to mix or agitate the drug vial as desired (e.g., after drug vial reconstitution) according to the vial agitation system. The first robotic arm 140 may include any number of mechanical and electromechanical components, sub-components, systems, power sources, measuring devices, processors, controllers, and the like to operate in an autonomous or semi-autonomous manner.

In the illustrated example, the second robotic arm 160 is used to add a fluid to (i.e., to reconstitute) and/or remove a fluid from the drug vial 110 while the drug vial 110 is disposed within a well 104. More specifically, as illustrated in the schematic of FIG. 2, the second robotic arm 160 includes any number of motors 162, a piercing and/or dispensing needle 164, a reconstitution assembly 165 including a number of fluid lines (not illustrated) in fluid communication with a fluid reservoir (not illustrated), and an arm position sensor 166. The second robotic arm 160 is responsive to a set of instructions or commands to initiate and execute a drug vial reconstitution system and a vial aspiration system. The motor or motors 162 move the second robotic arm 160 in the three dimensional space defined by the system 100, and move the piercing and/or dispensing needle 164 towards a desired drug vial 110 and selectively dispense a fluid into the drug vial 110 or draw a fluid from the drug vial 110. The fluid reservoir may include a pumping mechanism (not illustrated) to dispense specific quantities of the reconstituting fluid to the needle assembly 102 as desired. The second robotic arm 160 may include any number of mechanical and electromechanical components, sub-components, systems, power sources, measuring devices, processors, controllers, and the like to operate in an autonomous or semi-autonomous manner.

The computing system 120 may be configured to execute one or more algorithms, programs, or applications to move, mix, agitate, reconstitute, aspirate, collect, or otherwise analyze the drug vial 110 and/or the contents contained therein, and may obtain sensor data from the sensors 146, 166. For example, the computing system 120 may compare data received from the sensors 146, 166 in order to automatically determine whether a collision detection system should be engaged in response to receiving a particular command or take other actions. More specifically, one or more applications may generate or implement control commands to control the first robotic arm 140 or the second robotic arm 160, such as components that control the movement thereof, the grasping of particular drug vials 110, the reconstitution of the drug vials 110, and the like. To facilitate such control, the computing system 120 may be communicatively connected to the first robotic arm 140 and the second robotic arm 160 by various electrical or electromechanical connections. When a control command is generated by the computing system 120, it may thus be communicated to the control components of the first and second robotic arms 140, 160 to effect a control action.

The computing system 120 may include a controller 121 including a program memory 122, one or more processors 124 (e.g., microcontrollers or microprocessors), a RAM 126, and an interface I/O circuit 128, all of which are interconnected via an address/data bus 123. The program memory 122 may include an operating system 129, a data storage 130, a plurality of software applications 131, and/or a plurality of software routines 134 or systems. In some examples, the operating system 129 may include one of a plurality of general purpose or mobile platforms, such as the Windows®, macOS®, Android™, iOS®, or other custom operating system designed for drug processing using the computing system 120. The data storage 130 may include data such as user profiles and preferences, application data for the plurality of applications 131, routine data for the plurality of routines 134, and other data. In some embodiments, the controller 121 may also include, or otherwise be communicatively connected to, other data storage mechanisms (not shown), such as hard disk drives, optical storage drives, or solid state storage devices located within the system 100.

It should be appreciated that although FIG. 2 depicts a single processor 124, the controller 121 may include multiple processors 124. The processor 124 may be configured to execute any of one or more of the plurality of software applications 131 or any one or more of the plurality of software routines 134 residing in the program memory 122, in addition to other software applications. Similarly, the controller 121 may include multiple RAMs 126 and multiple program memories 122. The RAM 126 and program memory 122 may be semiconductor memories, magnetically readable memories, or optically readable memories, for example.

The data storage 130 may store various software applications 131 implemented as machine-readable instructions, which may include a drug vial transfer system or application 131a, an agitation system or application 131b, and a drug vial reconstitution system or application 131c. The drug vial transfer system 131a may cause the first robotic arm 140 to move or transfer a specified drug vial 110. The agitation system 131b may cause the first robotic arm 140 to mix or agitate the specified drug vial 110, and the drug vial reconstitution system 131c may cause the second robotic arm 160 to reconstitute the drug product contained within the drug vial 110. The generated control command may be communicated to the control components of the system 100 to effect a control action. The various software applications may be executed by the same computer processor 124 or by different computer processors. The various software applications 131 may call various software routines 134, such as the collision avoidance routine 134a to execute the various software applications 131.

Figure 3:
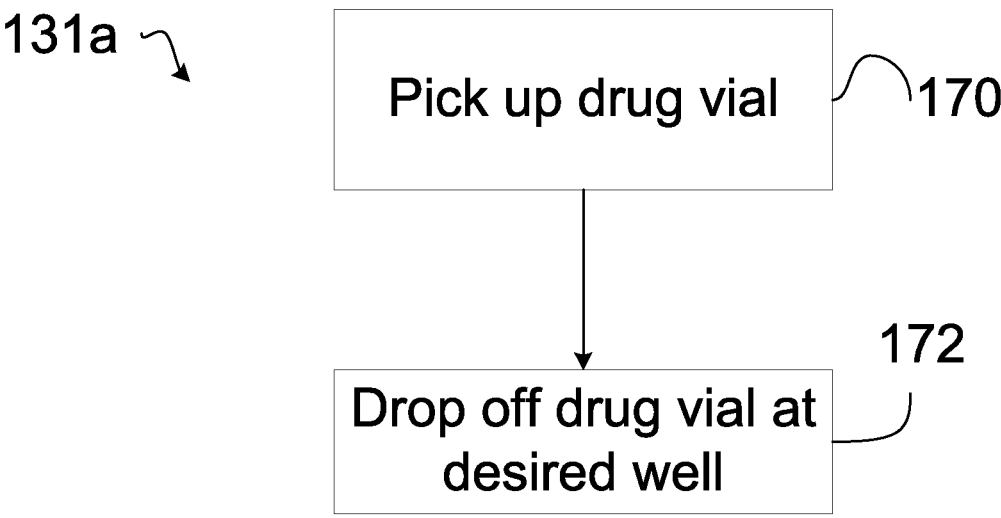
FIG. 3 illustrates an example flowchart for a vial transfer system in accordance with various embodiments.
Figure 4:
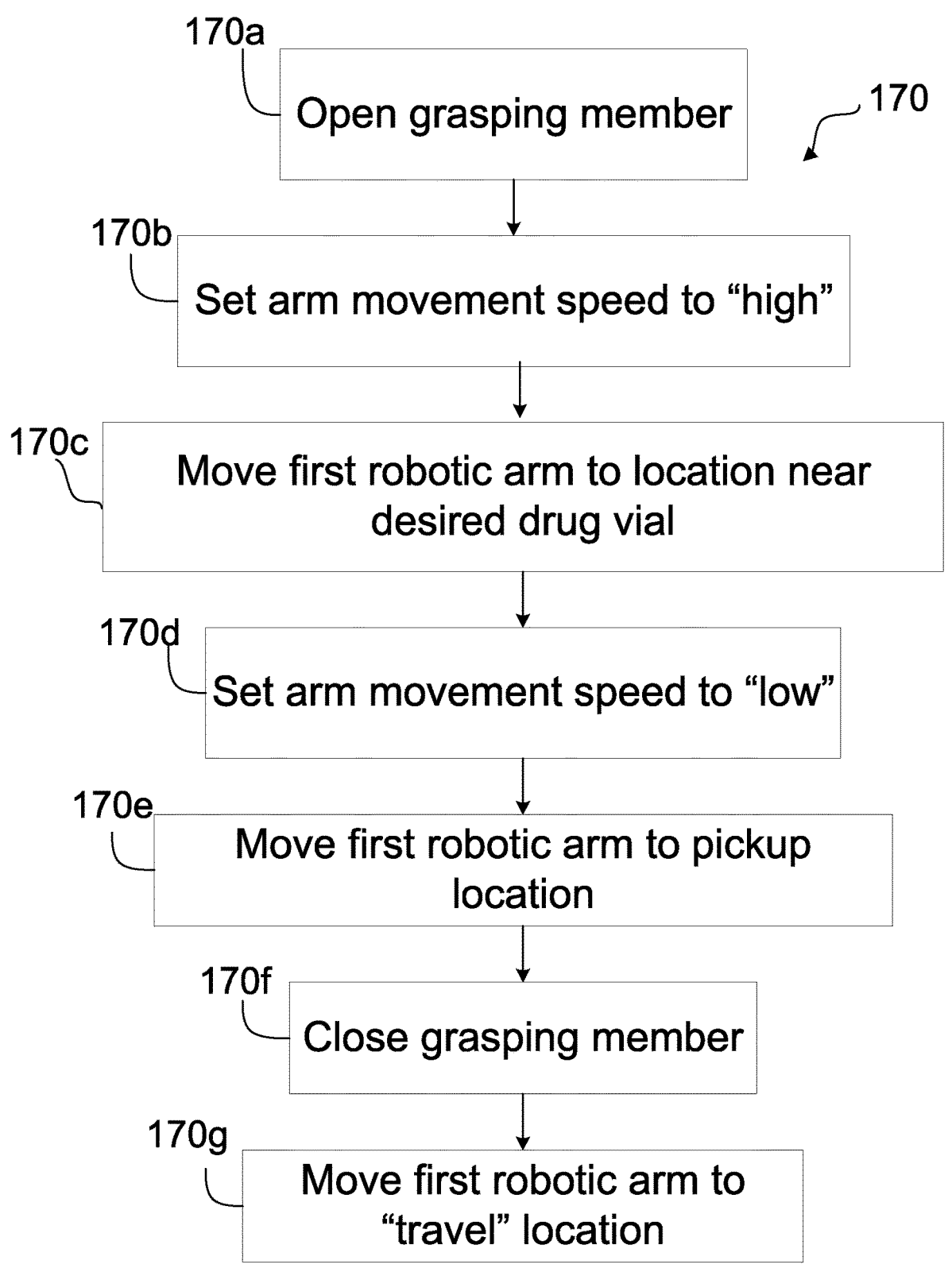
FIG. 4 illustrates an example detailed flowchart for the steps of picking up a desired drug vial in accordance with various embodiments.
Figure 5:
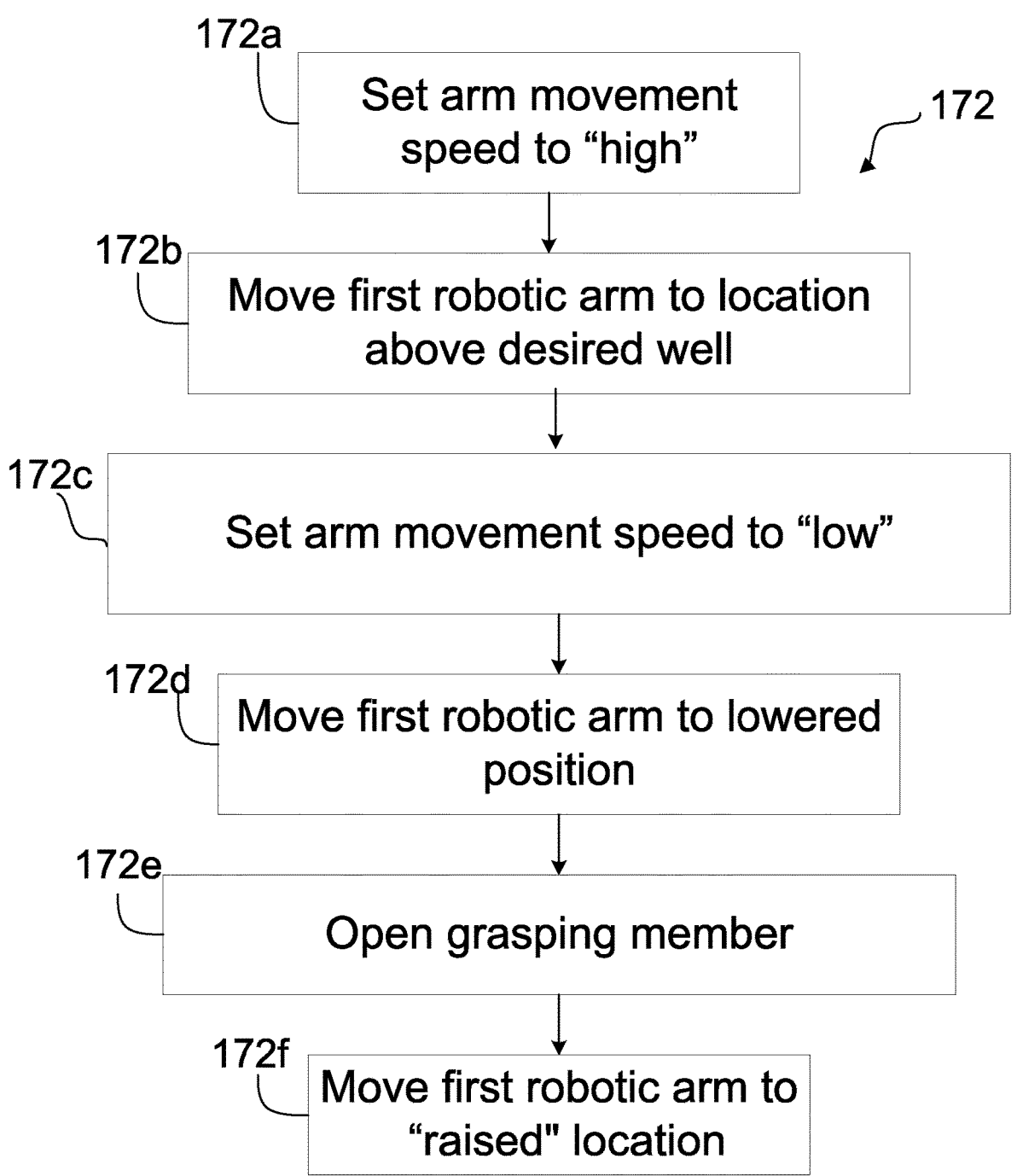
FIG. 5 illustrates an example detailed flowchart for the steps of dropping off a desired drug vial in accordance with various embodiments.

With reference to FIGS. 3-5, a flowchart illustrating the vial transfer system 131a is provided. In response to a command received by the computing system 120, the I/O circuit 128 interfaces with the first robotic arm 140. The vial transfer system 131a begins at a step 170 by picking up the desired drug vial 110. Next, at a step 172, the vial transfer system 131a drops off the desired drug vial 110 at a desired well 104. Turning to FIG. 4, a flowchart illustrating the step 170 of picking up the desired drug vial 110 is provided. First, at a step 170*a*, the motor 142 associated with the grasping member 144 opens the grasping member 144. Next, at a step 170*b*, the controller 121 sets an arm movement speed to "high." At a step 170*c*, the motor or motors 142 associated with movement of the first robotic arm 140 move the first robotic arm 140 to a location near the desired drug vial 110. At a step 170*d*, the controller 121 sets the arm movement speed to "low." Next, at a step 170*e*, the motor or motors 142 associated with movement of the first robotic arm 140 move the first robotic arm 140 to a pickup location, and at a step 170*f*, the motor 142 associated with the grasping member 144 closes the grasping member 144 about the drug vial 110. Last, at a step 170*g*, the motor or motors 142 associated with movement of the first robotic arm 140 move the first robotic arm 140 to a "travel" location.

Turning to FIG. 5, a flowchart illustrating the step 172 of dropping off the desired drug vial 110 at the desired well 104 is provided. First, at a step 172*a*, the controller 121 sets the arm movement speed to "high." Next, at a step 172*b*, the motor or motors 142 associated with movement of the first robotic arm 140 move the first robotic arm 140 to a desired location which, in some examples, is generally above the desired well 104. Next, at a step 172*c*, the controller 121 sets the arm movement speed to "low." At a step 172*d*, the motor or motors 142 associated with movement of the first robotic arm 140 move the first robotic arm 140 to a lowered position whereby the drug vial 110 is disposed within the desired well 104. At a step 172*e*, the motor associated with the grasping member 144 opens the grasping member 144 to release the drug vial 110. Last, at a step 172*f*, the motor or motors 142 associated with movement of the first robotic arm 140 move the first robotic arm 140 to a raised position.

Figure 6:
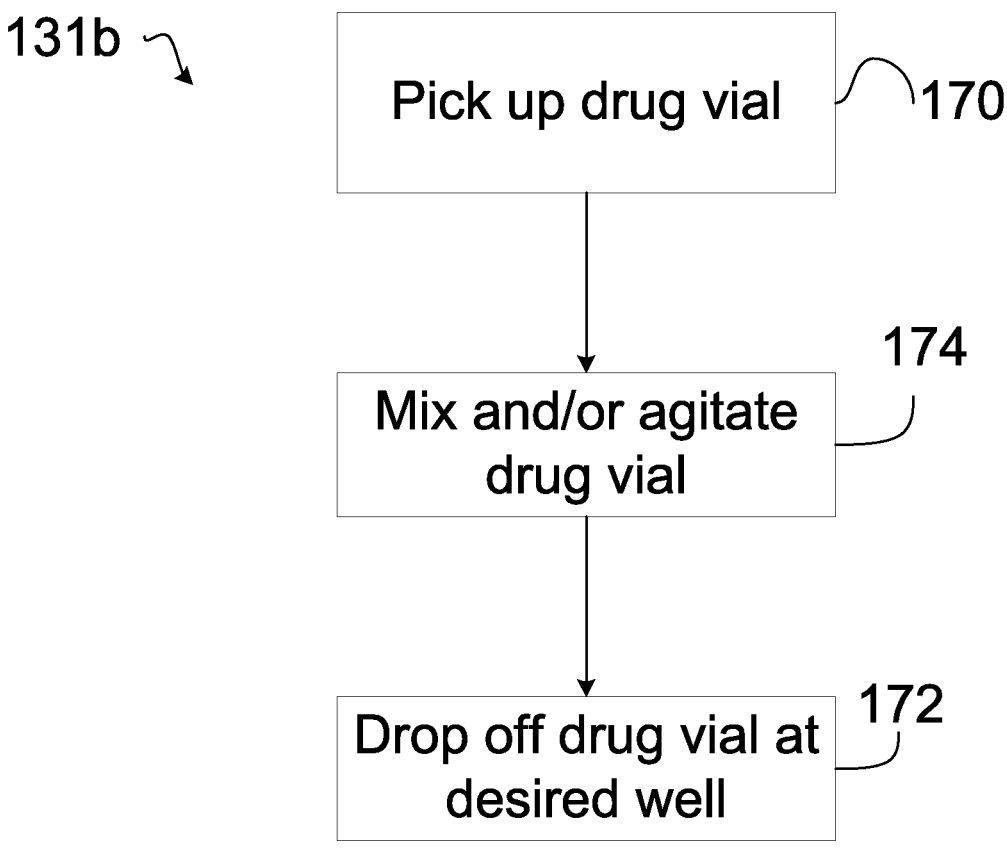
FIG. 6 illustrates an example flowchart for an agitation system in accordance with various embodiments.
Figure 7:
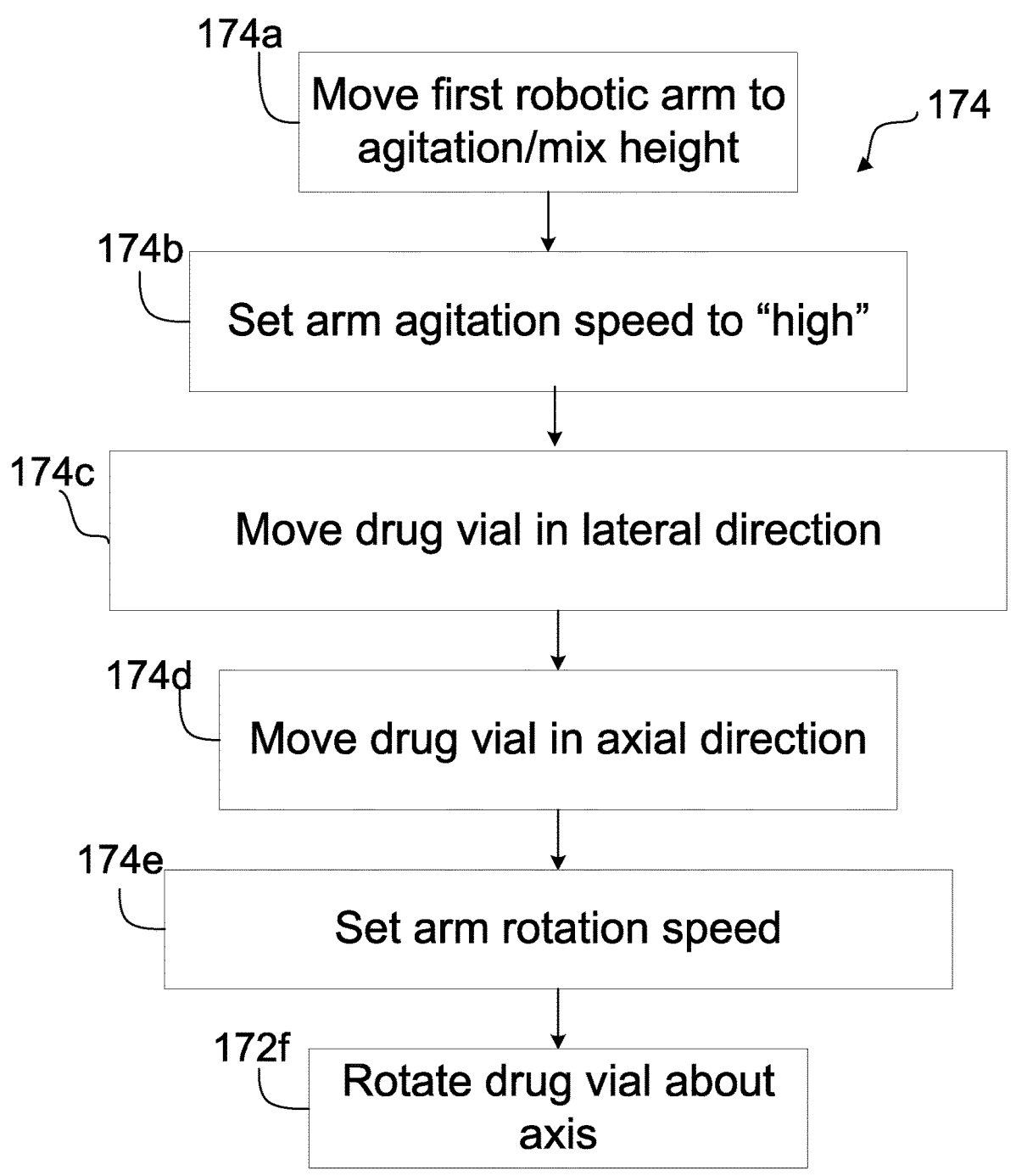
FIG. 7 illustrates an example detailed flowchart for the steps of mixing and/or agitating the desired drug vial in accordance with various embodiments.

With reference to FIGS. 6 and 7, a flowchart illustrating the agitation system 131*b* is provided. In response to a command received by the computing system 120, the I/O circuit 128 interfaces with the first robotic arm 140. The agitation system 131*b* begins at a step 170 by picking up the desired drug vial 110. It is appreciated that the step 170 described with regard to the agitation system 131*b* may be the same step 170 described with regard to the drug vial transfer system 131*a*. Next, at a step 174, the agitation system 131*b* mixes and/or agitates the drug vial 110. Last, at a step 172, the agitation system 131*b* drops off the desired drug vial 110 at the desired well 104. It is appreciated that the step 172 described with regard to the agitation system 131*b* may be the same step 172 described with regard to the drug vial transfer system 131*a*.

Turning to FIG. 7, a flowchart illustrating the step 174 of mixing and/or agitating the drug vial 110 is provided. First, at a step 174*a*, the motor or motors 142 associated with movement of the first robotic arm 140 move the first robotic arm 140 to an agitation/mix height sufficiently high enough to avoid contact between the drug vial 110 and the drug vial tray 102. In some examples, prior to this step 174*a*, the controller 121 may set the arm movement speed to a desired speed. At a step 174*b*, the controller 121 sets the arm agitation speed to a desired value. Next, at a step 174*c*, the motor or motors 142 associated with mixing and/or agitating the drug vial 110 move the drug vial 110 in a lateral direction a desired number of times. In some examples, the step 174*c* may include moving the drug vial 110 in opposite lateral directions (e.g., left or right) two, three, four, five, six, or seven or more times. The motor or motors 142 associated with mixing and/or agitating the drug vial 110 may move a total of approximately 15 mm in each direction. Other examples are possible.

Next, at a step 174*d*, the motor or motors 142 associated with mixing and/or agitating the drug vial 110 move the drug vial 110 in an axial direction a desired number of times. In some examples, the step 174*d* may include moving the drug vial 110 in opposite directions (e.g., up or down) two, three, four, five, six, seven, or more times. The motor or motors 142 associated with mixing and/or agitating the drug vial 110 may move a total of approximately 15 mm in each direction. Other examples are possible. Next, at a step 174*e*, the controller 121 sets the arm rotation speed to a desired value (e.g., 1.3 revolutions per second). Next, at a step 174*f*, the motor or motors 142 associated with mixing and/or agitating the drug vial 110 rotate or spin the drug vial 110 about an axis a desired number of times. In some examples, the step 174*f* may include rotating the drug vial 110 in a first direction one, two, three, four, five or more times followed by rotating the drug vial 110 in a second opposite direction one, two, three, four, five or more times. Other examples are possible.

Figure 8:
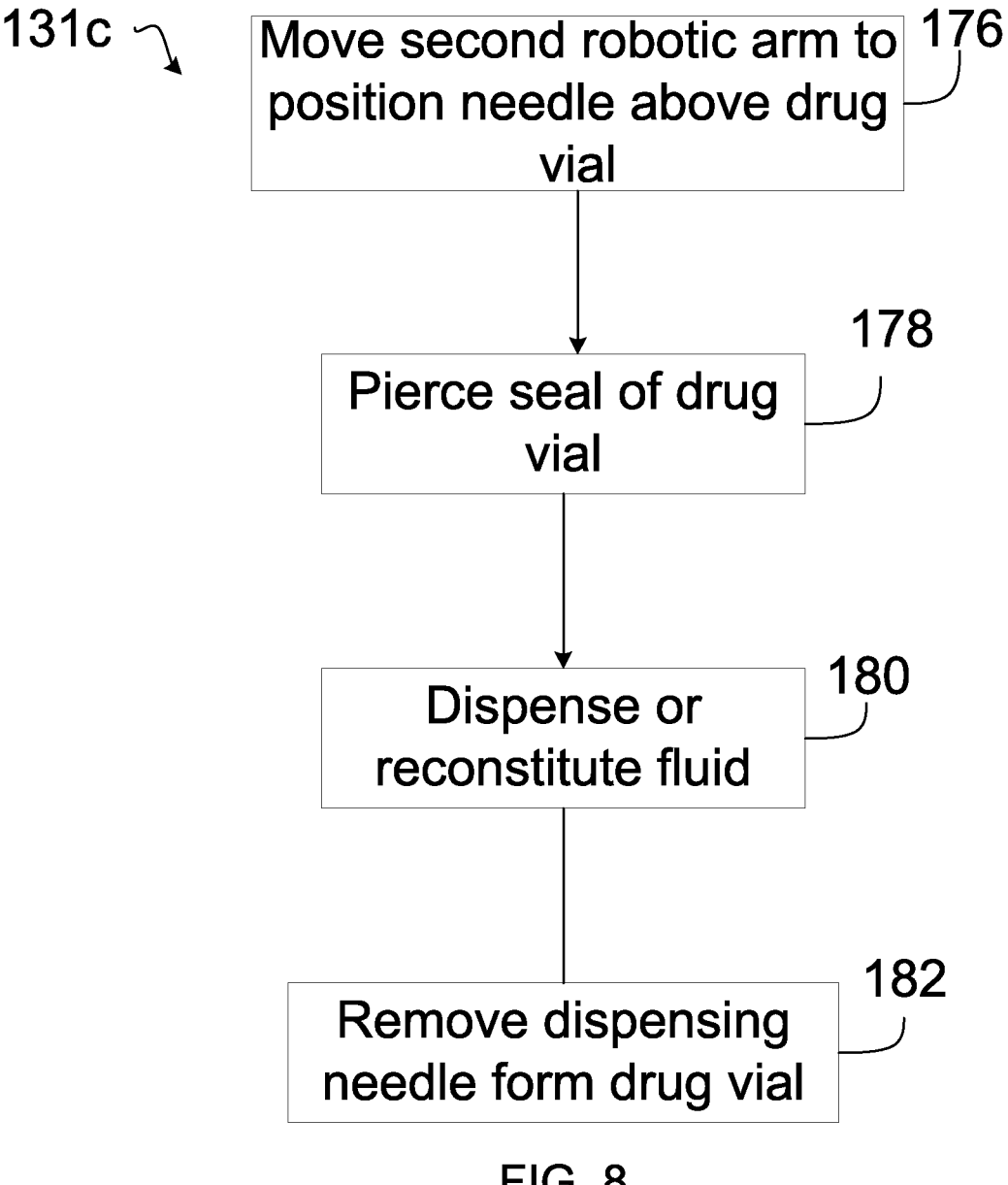
FIG. 8 illustrates an example flowchart for a vial reconstitution system in accordance with various embodiments.

With reference to FIG. 8, a flowchart illustrating the drug vial reconstitution system 131*c* is provided. In response to a command received by the computing system 120, the I/O circuit 128 interfaces with the second robotic arm 160. The drug vial reconstitution system 131*c* begins at a step 176 by moving the piercing or dispensing needle 164 to a position above the desired drug vial 110. At a step 178, the piercing or dispensing needle 164 pierces the seal of the drug vial 110. At a step 180, the reconstitution assembly 165 either dispenses a reconstituting fluid into the drug vial 110 or draws the liquid contained within the drug vial 110 from the drug vial 110. At a step 182, the piercing or dispensing needle 164 is removed from the drug vial 110.

Figure 9:
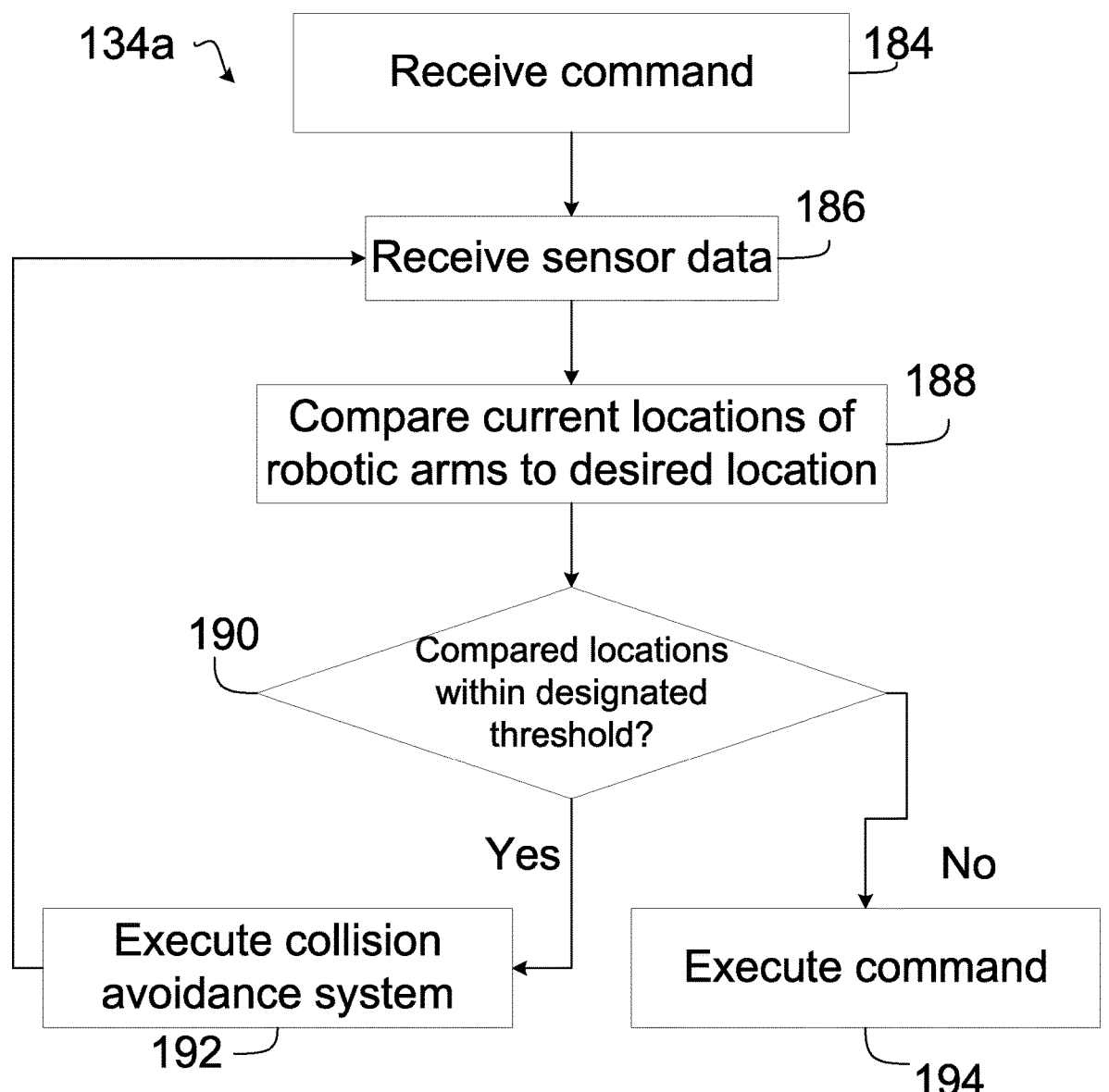
FIG. 9 illustrates an example flowchart for an example collision avoidance routine in accordance with various embodiments.

Prior to the execution of a command, the computing system 120 may execute the collision avoidance routine 134*a*. With reference to FIG. 9, a flowchart illustrating the collision avoidance routine 134*a* is provided. At a step 184, the computing system may receive a command (e.g., a command to execute a software application 131). At a step 186, the I/O circuit 128 receives sensor data from each of the arm position sensors 146, 166 representative of the current locations of the first and second robotic arms 140, 160. At a step 188, the processor 124 compares the current locations of the first and second robotic arms 140, 160 with the desired location of the well 104 the first or second robotic arms 140, 160 is instructed to move to. At a step 190, the processor 124 determines whether the compared locations are within a designated threshold or buffer value (e.g., approximately 120 mm), and if so, at a step 192, the routine proceeds to execute a collision avoidance system or application 131*d*. If the compared locations are not within the designated threshold or buffer value, the routine proceeds to step 194, whereby the command is executed in a manner previously described.

Figure 10:
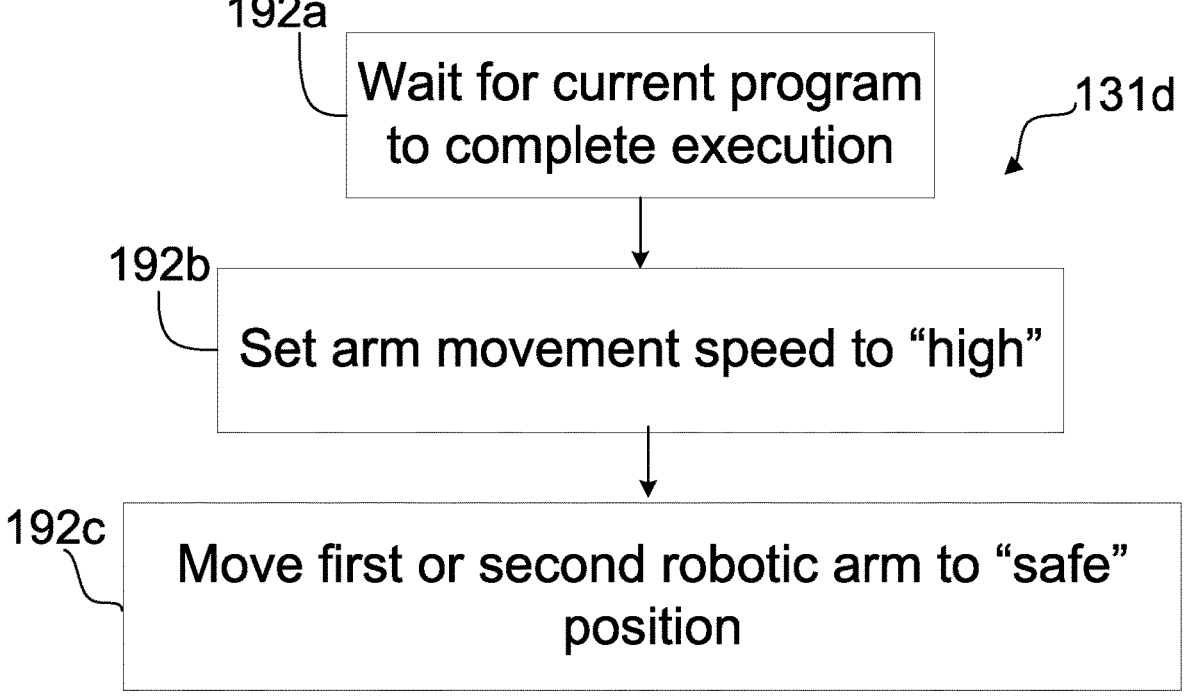
FIG. 10 illustrates an example flowchart for an example collision avoidance system in accordance with various embodiments.

With reference to FIG. 10, a flowchart illustrating the collision avoidance system 131*d* is provided. In response to a command received by the computing system 120 to execute the system 131*d*, the I/O circuit 128 interfaces with the first robotic arm 140 and/or the second robotic arm 160 depending on which of the robotic arms the command received at step 184 involves. More specifically, if the command involves moving the first robotic arm 140, the collision avoidance system 131*d* will perform the steps on the first robotic arm 140, and if the command involves moving the second robotic arm 160, the collision avoidance system 131*d* will perform the steps on the second robotic arm 160. The collision avoidance system 131*d* begins at a step 192*a* by waiting for the current program to complete execution. Put differently, if the command involves the first robotic arm 140, the system 131*d* will wait for the program that is currently being performed by the second robotic arm 160 to complete execution, and vice-versa. At a step 192*b*, the controller 121 sets the arm movement speed to "high." At a step 192*c*, the motor or motors 142 associated with movement of the first robotic arm 140 (or the second robotic arm 160) move the first robotic arm 140 (or the second robotic arm 160) to a "safe" position in an opposite direction from the second robotic arm 160 (or the first robotic arm 140). In some examples, the collision avoidance system 131*d* may then determine whether the program has completed by the other robotic arm 140, 160.

So configured, the system 100 provides for efficiently reconstituting, mixing, and/or analyzing the drug vials 110 simultaneously, thus reducing overall processing times. Further, because the robotic arm that is primarily responsible for moving the drug vials 110 is equipped with additional motors, the robotic arm may mix and/or agitate the drug vial 110, thereby eliminating the need for additional vortexes or other mixing systems. Additionally, the collision avoidance system may enhance overall safety of the system by ensuring the parallel processes do not physically interfere with one another, thus reducing and/or eliminating a likelihood of damaging drug vials.

It will be appreciated that the systems and approaches described herein may be used for the storage and transport of drugs in various states, such as but not limited to drug products which have undergone completion of mixing and/or other finishing steps, drug substances which are intended to be mixed and/or finished after shipping, components or ingredients to be used in a drug, or other drug-related states or components.

The above description describes various devices, assemblies, components, subsystems and methods for use related to a drug delivery device. The devices, assemblies, components, subsystems, methods or drug delivery devices can further comprise or be used with a drug including but not limited to those drugs identified below as well as their generic and biosimilar counterparts. The term drug, as used herein, can be used interchangeably with other similar terms and can be used to refer to any type of medicament or therapeutic material including traditional and non-traditional pharmaceuticals, nutraceuticals, supplements, biologics, biologically active agents and compositions, large molecules, biosimilars, bioequivalents, therapeutic antibodies, polypeptides, proteins, small molecules and generics. Non-therapeutic injectable materials are also encompassed. The drug may be in liquid form, a lyophilized form, or in a reconstituted from lyophilized form. The following example list of drugs should not be considered as all-inclusive or limiting.

The drug will be contained in a reservoir. In some instances, the reservoir is a primary container that is either filled or pre-filled for treatment with the drug. The primary container can be a vial, a cartridge or a pre-filled syringe.

In some embodiments, the reservoir of the drug delivery device may be filled with or the device can be used with colony stimulating factors, such as granulocyte colony-stimulating factor (G-CSF). Such G-CSF agents include but are not limited to Neulasta® (pegfilgrastim, pegylated filgastrim, pegylated G-CSF, pegylated hu-Met-G-CSF) and Neupogen® (filgrastim, G-CSF, hu-MetG-CSF), UDE-NYCA® (pegfilgrastim-cbqv), Ziextenzo® (LA-EP2006; pegfilgrastim-bmez), or FULPHILA (pegfilgrastim-bmez).

In other embodiments, the drug delivery device may contain or be used with an erythropoiesis stimulating agent (ESA), which may be in liquid or lyophilized form. An ESA is any molecule that stimulates erythropoiesis. In some embodiments, an ESA is an erythropoiesis stimulating protein. As used herein, "erythropoiesis stimulating protein" means any protein that directly or indirectly causes activation of the erythropoietin receptor, for example, by binding to and causing dimerization of the receptor. Erythropoiesis stimulating proteins include erythropoietin and variants, analogs, or derivatives thereof that bind to and activate erythropoietin receptor; antibodies that bind to erythropoietin receptor and activate the receptor; or peptides that bind to and activate erythropoietin receptor. Erythropoiesis stimulating proteins include, but are not limited to, Epogen® (epoetin alfa), Aranesp® (darbepoetin alfa), Dynepo® (epoetin delta), Mircera® (methyoxy polyethylene glycol-epoetin beta), Hematide®, MRK-2578, INS-22, Retacrit® (epoetin zeta), Neorecormon® (epoetin beta), Silapo® (epoetin zeta), Binocrit® (epoetin alfa), epoetin alfa Hexal, Abseamed® (epoetin alfa), Ratioepo® (epoetin theta), Eporatio® (epoetin theta), Biopoin® (epoetin theta), epoetin alfa, epoetin beta, epoetin iota, epoetin omega, epoetin delta, epoetin zeta, epoetin theta, and epoetin delta, pegylated erythropoietin, carbamylated erythropoietin, as well as the molecules or variants or analogs thereof.

Among particular illustrative proteins are the specific proteins set forth below, including fusions, fragments, analogs, variants or derivatives thereof: OPGL specific antibodies, peptibodies, related proteins, and the like (also referred to as RANKL specific antibodies, peptibodies and the like), including fully humanized and human OPGL specific antibodies, particularly fully humanized monoclonal antibodies; Myostatin binding proteins, peptibodies, related proteins, and the like, including myostatin specific peptibodies; IL-4 receptor specific antibodies, peptibodies, related proteins, and the like, particularly those that inhibit activities mediated by binding of IL-4 and/or IL-13 to the receptor; Interleukin 1-receptor 1 ("IL1-R1") specific antibodies, peptibodies, related proteins, and the like; Ang2 specific antibodies, peptibodies, related proteins, and the like; NGF specific antibodies, peptibodies, related proteins, and the like; CD22 specific antibodies, peptibodies, related proteins, and the like, particularly human CD22 specific antibodies, such as but not limited to humanized and fully human antibodies, including but not limited to humanized and fully human monoclonal antibodies, particularly including but not limited to human CD22 specific IgG antibodies, such as, a dimer of a human-mouse monoclonal hLL2 gamma-chain disulfide linked to a human-mouse monoclonal hLL2 kappa-chain, for example, the human CD22 specific fully humanized antibody in Epratuzumab, CAS registry number 501423-23-0; IGF-1 receptor specific antibodies, peptibodies, and related proteins, and the like including but not limited to anti-IGF-1R antibodies; B-7 related protein 1 specific antibodies, peptibodies, related proteins and the like ("B7RP-1" and also referring to B7H2, ICOSL, B7h, and CD275), including but not limited to B7RP-specific fully human monoclonal IgG2 antibodies, including but not limited to fully human IgG2 monoclonal antibody that binds an epitope in the first immunoglobulin-like domain of B7RP-1, including but not limited to those that inhibit the interaction of B7RP-1 with its natural receptor, ICOS, on activated T cells; IL-15 specific antibodies, peptibodies, related proteins, and the like, such as, in particular, humanized monoclonal antibodies, including but not limited to HuMax IL-15 antibodies and related proteins, such as, for instance, 145c7; IFN gamma specific antibodies, peptibodies, related proteins and the like, including but not limited to human IFN gamma specific antibodies, and including but not limited to fully human anti-IFN gamma antibodies; TALL-1 specific antibodies, peptibodies, related proteins, and the like, and other TALL specific binding proteins; Parathyroid hormone ("PTH") specific antibodies, peptibodies, related proteins, and the like; Thrombopoietin receptor ("TPO-R") specific antibodies, peptibodies, related proteins, and the like; Hepatocyte growth factor ("HGF") specific antibodies, peptibodies, related proteins, and the like, including those that target the HGF/SF:cMet axis (HGF/SF:c-Met), such as fully human monoclonal antibodies that neutralize hepatocyte growth factor/scatter (HGF/SF); TRAIL-R2 specific antibodies, peptibodies, related proteins and the like; Activin A specific antibodies, peptibodies, proteins, and the like; TGF-beta specific antibodies, peptibodies, related proteins, and the like; Amyloid-beta protein specific antibodies, peptibodies, related proteins, and the like; c-Kit specific antibodies, peptibodies, related proteins, and the like, including but not limited to proteins that bind c-Kit and/or other stem cell factor receptors; OX40L specific antibodies, peptibodies, related proteins, and the like, including but not limited to proteins that bind OX40L and/or other ligands of the OX40 receptor; Activase® (alteplase, tPA); Aranesp® (darbepoetin alfa) Erythropoietin [30-asparagine, 32-threonine, 87-valine, 88-asparagine, 90-threonine], Darbepoetin alfa, novel erythropoiesis stimulating protein (NESP); Epogen® (epoetin alfa, or erythropoietin); GLP-1, Avonex® (interferon beta-1a); Bexxar® (tositumomab, anti-CD22 monoclonal antibody); Betaseron® (interferon-beta); Campath® (alemtuzumab, anti-CD52 monoclonal antibody); Dynepo® (epoetin delta); Velcade® (bortezomib); MLN0002 (anti-?4ß7 mAb); MLN1202 (anti-CCR2 chemokine receptor mAb); Enbrel® (etanercept, TNF-receptor/Fc fusion protein, TNF blocker); Eprex® (epoetin alfa); Erbitux® (cetuximab, anti-EGFR/HER1/c-ErbB-1); Genotropin® (somatropin, Human Growth Hormone); Herceptin® (trastuzumab, anti-HER2/neu (erbB2) receptor mAb); Kanjinti™ (trastuzumab-anns) anti-HER2 monoclonal antibody, biosimilar to Herceptin®, or another product containing trastuzumab for the treatment of breast or gastric cancers; Humatrope® (somatropin, Human Growth Hormone); Humira® (adalimumab); Vectibix® (panitumumab), Xgeva® (denosumab), Prolia® (denosumab), Immunoglobulin G2 Human Monoclonal Antibody to RANK Ligand, Enbrel® (etanercept, TNF-receptor/Fc fusion protein, TNF blocker); Nplate® (romiplostim), rilotumumab, ganitumab, conatumumab, brodalumab, insulin in solution; Infergen® (interferon alfacon-1); Natrecor® (nesiritide; recombinant human B-type natriuretic peptide (hBNP); Kineret® (anakinra); Leukine® (sargamostim, rhuGM-CSF); LymphoCide® (epratuzumab, anti-CD22 mAb); Benlysta™ (lymphostat B, belimumab, anti-BlyS mAb); Metalyse® (tenecteplase, t-PA analog); Mircera® (methoxy polyethylene glycol-epoetin beta); Mylotarg® (gemtuzumab ozogamicin); Raptiva® (efalizumab); Cimzia® (certolizumab pegol, CDP 870); Solids™ (eculizumab); pexelizumab (anti-C5 complement); Numax® (MEDI-524); Lucentis® (ranibizumab); Panorex® (17-1A, edrecolomab); Trabio® (lerdelimumab); TheraCim hR3 (nimotuzumab); Omnitarg (pertuzumab, 2C4); Osidem® (IDM-1); Ova-Rex® (B43.13); Nuvion® (visilizumab); cantuzumab mertansine (huC242-DM1); NeoRecormon® (epoetin beta); Neumega® (oprelvekin, human interleukin-11); Orthoclone OKT3® (muromonab-CD3, anti-CD3 monoclonal antibody); Procrit® (epoetin alfa); Remicade® (infliximab, anti-TNF? monoclonal antibody); Reopro® (abciximab, anti-GP IIb/IIia receptor monoclonal antibody); Actemra® (anti-IL6

Receptor mAb); Avastin® (bevacizumab), HuMax-CD4 (zanolimumab); Mvasi™ (bevacizumab-awwb); Rituxan® (rituximab, anti-CD20 mAb); Tarceva® (erlotinib); Roferon-A®-(interferon alfa-2a); Simulect® (basiliximab); Prexige® (lumiracoxib); Synagis® (palivizumab); 145c7-CHO (anti-IL15 antibody, see U.S. Pat. No. 7,153,507); Tysabri® (natalizumab, anti-?4integrin mAb); Valortim® (MDX-1303, anti-*B. anthracis* protective antigen mAb); ABthrax™; Xolair® (omalizumab); ETI211 (anti-MRSA mAb); IL-1 trap (the Fc portion of human IgG1 and the extracellular domains of both IL-1 receptor components (the Type I receptor and receptor accessory protein)); VEGF trap (Ig domains of VEGFR1 fused to IgG1 Fc); Zenapax® (daclizumab); Zenapax® (daclizumab, anti-IL-2R? mAb); Zevalin® (ibritumomab tiuxetan); Zetia® (ezetimibe); Orencia® (atacicept, TACI-Ig); anti-CD80 monoclonal antibody (galiximab); anti-CD23 mAb (lumiliximab); BR2-Fc (huBR3/huFc fusion protein, soluble BAFF antagonist); CNTO 148 (golimumab, anti-TNF? mAb); HGS-ETR1 (mapatumumab; human anti-TRAIL Receptor-1 mAb); HuMax-CD20 (ocrelizumab, anti-CD20 human mAb); HuMax-EGFR (zalutumumab); M200 (volociximab, anti-?5?1 integrin mAb); MDX-010 (ipilimumab, anti-CTLA-4 mAb and VEGFR-1 (IMC-18F1); anti-BR3 mAb; anti-*C. difficile* Toxin A and Toxin B C mAbs MDX-066 (CDA-1) and MDX-1388); anti-CD22 dsFv-PE38 conjugates (CAT-3888 and CAT-8015); anti-CD25 mAb (HuMax-TAC); anti-CD3 mAb (NI-0401); adecatumumab; anti-CD30 mAb (MDX-060); MDX-1333 (anti-IFNAR); anti-CD38 mAb (HuMax CD38); anti-CD40L mAb; anti-Cripto mAb; anti-CTGF Idiopathic Pulmonary Fibrosis Phase I Fibrogen (FG-3019); anti-CTLA4 mAb; anti-eotaxin1 mAb (CAT-213); anti-FGF8 mAb; anti-ganglioside GD2 mAb; anti-ganglioside GM2 mAb; anti-GDF-8 human mAb (MYO-029); anti-GM-CSF Receptor mAb (CAM-3001); anti-HepC mAb (HuMax HepC); anti-IFN? mAb (MEDI-545, MDX-198); anti-IGF1R mAb; anti-IGF-1R mAb (HuMax-Inflam); anti-IL12 mAb (ABT-874); anti-IL12/IL23 mAb (CNTO 1275); anti-IL13 mAb (CAT-354); anti-IL2Ra mAb (HuMax-TAC); anti-IL5 Receptor mAb; anti-integrin receptors mAb (MDX-018, CNTO 95); anti-IP10 Ulcerative Colitis mAb (MDX-1100); BMS-66513; anti-Mannose Receptor/hCG? mAb (MDX-1307); anti-mesothelin dsFv-PE38 conjugate (CAT-5001); anti-PD1mAb (MDX-1106 (ONO-4538)); anti-PDGFR? antibody (IMC-3G3); anti-TGFß mAb (GC-1008); anti-TRAIL Receptor-2 human mAb (HGS-ETR2); anti-TWEAK mAb; anti-VEGFR/Flt-1 mAb; and anti-ZP3 mAb (HuMax-ZP3).

In some embodiments, the drug delivery device may contain or be used with a sclerostin antibody, such as but not limited to romosozumab, blosozumab, BPS 804 (Novartis), Evenity™ (romosozumab-aqqg), another product containing romosozumab for treatment of postmenopausal osteoporosis and/or fracture healing and in other embodiments, a monoclonal antibody (IgG) that binds human Proprotein Convertase Subtilisin/Kexin Type 9 (PCSK9). Such PCSK9 specific antibodies include, but are not limited to, Repatha® (evolocumab) and Praluent® (alirocumab). In other embodiments, the drug delivery device may contain or be used with rilotumumab, bixalomer, trebananib, ganitumab, conatumumab, motesanib diphosphate, brodalumab, vidupiprant or panitumumab. In some embodiments, the reservoir of the drug delivery device may be filled with or the device can be used with IMLYGIC® (talimogene laherparepvec) or another oncolytic HSV for the treatment of melanoma or other cancers including but are not limited to OncoV-EXGALV/CD; OrienX010; G207, 1716; NV1020;

NV12023; NV1034; and NV1042. In some embodiments, the drug delivery device may contain or be used with endogenous tissue inhibitors of metalloproteinases (TIMPs) such as but not limited to TIMP-3. In some embodiments, the drug delivery device may contain or be used with Aimovig® (erenumab-aooe), anti-human CGRP-R (calcitonin gene-related peptide type 1 receptor) or another product containing erenumab for the treatment of migraine headaches. Antagonistic antibodies for human calcitonin gene-related peptide (CGRP) receptor such as but not limited to erenumab and bispecific antibody molecules that target the CGRP receptor and other headache targets may also be delivered with a drug delivery device of the present disclosure. Additionally, bispecific T cell engager (BITE®) molecules such as but not limited to BLINCYTO® (blinatumomab) can be used in or with the drug delivery device of the present disclosure. In some embodiments, the drug delivery device may contain or be used with an APJ large molecule agonist such as but not limited to apelin or analogues thereof. In some embodiments, a therapeutically effective amount of an anti-thymic stromal lymphopoietin (TSLP) or TSLP receptor antibody is used in or with the drug delivery device of the present disclosure. In some embodiments, the drug delivery device may contain or be used with Avsola™ (infliximab-axxq), anti-TNF? monoclonal antibody, biosimilar to Remicade® (infliximab) (Janssen Biotech, Inc.) or another product containing infliximab for the treatment of autoimmune diseases. In some embodiments, the drug delivery device may contain or be used with Kyprolis® (carfilzomib), (2S)—N—((S)-1-((S)-4-methyl-1-((R)-2-methyloxiran-2-yl)-1-oxopentan-2-ylcarbamoyl)-2-phenylethyl)-2-((S)-2-(2-morpholinoacetamido)-4-phenylbutanamido)-4-methylpentanamide, or another product containing carfilzomib for the treatment of multiple myeloma. In some embodiments, the drug delivery device may contain or be used with Otezla® (apremilast), N-[2-[(1S)-1-(3-ethoxy-4-methoxyphenyl)-2-(methylsulfonyl) ethyl]-2,3-dihydro-1,3-dioxo-1H-isoindol-4-yl]acetamide, or another product containing apremilast for the treatment of various inflammatory diseases. In some embodiments, the drug delivery device may contain or be used with Parsabiv™ (etelcalcetide HCl, KAI-4169) or another product containing etelcalcetide HCl for the treatment of secondary hyperparathyroidism (sHPT) such as in patients with chronic kidney disease (KD) on hemodialysis. In some embodiments, the drug delivery device may contain or be used with ABP 798 (rituximab), a biosimilar candidate to Rituxan®/MabThera™, or another product containing an anti-CD20 monoclonal antibody. In some embodiments, the drug delivery device may contain or be used with a VEGF antagonist such as a non-antibody VEGF antagonist and/or a VEGF-Trap such as aflibercept (Ig domain 2 from VEGFR1 and Ig domain 3 from VEGFR2, fused to Fc domain of IgG1). In some embodiments, the drug delivery device may contain or be used with ABP 959 (eculizumab), a biosimilar candidate to Soliris®, or another product containing a monoclonal antibody that specifically binds to the complement protein C5. In some embodiments, the drug delivery device may contain or be used with Rozibafusp alfa (formerly AMG 570) is a novel bispecific antibody-peptide conjugate that simultaneously blocks ICOSL and BAFF activity. In some embodiments, the drug delivery device may contain or be used with Omecamtiv mecarbil, a small molecule selective cardiac myosin activator, or myotrope, which directly targets the contractile mechanisms of the heart, or another product containing a small molecule selective cardiac myosin activator. In some embodiments, the drug delivery device may contain or be used with Sotorasib (formerly known as AMG 510), a KRASG12C small molecule inhibitor, or another product containing a KRASG12C small molecule inhibitor. In some embodiments, the drug delivery device may contain or be used with Tezepelumab, a human monoclonal antibody that inhibits the action of thymic stromal lymphopoietin (TSLP), or another product containing a human monoclonal antibody that inhibits the action of TSLP. In some embodiments, the drug delivery device may contain or be used with AMG 714, a human monoclonal antibody that binds to Interleukin-15 (IL-15) or another product containing a human monoclonal antibody that binds to Interleukin-15 (IL-15). In some embodiments, the drug delivery device may contain or be used with AMG 890, a small interfering RNA (siRNA) that lowers lipoprotein(a), also known as Lp(a), or another product containing a small interfering RNA (siRNA) that lowers lipoprotein(a). In some embodiments, the drug delivery device may contain or be used with ABP 654 (human IgG1 kappa antibody), a biosimilar candidate to Stelara®, or another product that contains human IgG1 kappa antibody and/or binds to the p40 subunit of human cytokines interleukin (IL)-12 and IL-23. In some embodiments, the drug delivery device may contain or be used with Amjevita™ or Amgevita™ (formerly ABP 501) (mab anti-TNF human IgG1), a biosimilar candidate to Humira®, or another product that contains human mab anti-TNF human IgG1. In some embodiments, the drug delivery device may contain or be used with AMG 160, or another product that contains a half-life extended (HLE) anti-prostate-specific membrane antigen (PSMA)×anti-CD3 BiTE® (bispecific T cell engager) construct. In some embodiments, the drug delivery device may contain or be used with AMG 119, or another product containing a delta-like ligand 3 (DLL3) CAR T (chimeric antigen receptor T cell) cellular therapy. In some embodiments, the drug delivery device may contain or be used with AMG 119, or another product containing a delta-like ligand 3 (DLL3) CART (chimeric antigen receptor T cell) cellular therapy. In some embodiments, the drug delivery device may contain or be used with AMG 133, or another product containing a gastric inhibitory polypeptide receptor (GIPR) antagonist and GLP-1R agonist. In some embodiments, the drug delivery device may contain or be used with AMG 171 or another product containing a Growth Differential Factor 15 (GDF15) analog. In some embodiments, the drug delivery device may contain or be used with AMG 176 or another product containing a small molecule inhibitor of myeloid cell leukemia 1 (MCL-1). In some embodiments, the drug delivery device may contain or be used with AMG 199 or another product containing a half-life extended (HLE) bispecific T cell engager construct (BITE®). In some embodiments, the drug delivery device may contain or be used with AMG 256 or another product containing an anti-PD-1×IL21 mutein and/or an IL-21 receptor agonist designed to selectively turn on the Interleukin 21 (IL-21) pathway in programmed cell death-1 (PD-1) positive cells. In some embodiments, the drug delivery device may contain or be used with AMG 330 or another product containing an anti-CD33×anti-CD3 BiTE® (bispecific T cell engager) construct. In some embodiments, the drug delivery device may contain or be used with AMG 404 or another product containing a human anti-programmed cell death-1 (PD-1) monoclonal antibody being investigated as a treatment for patients with solid tumors. In some embodiments, the drug delivery device may contain or be used with AMG 427 or another product containing a half-life extended (HLE) anti-fms-like tyrosine kinase 3 (FLT3)×anti-CD3 BiTE® (bispecific T cell engager) construct. In some embodiments, the drug delivery device may contain or be used with AMG 430 or another product containing an anti-Jagged-1 monoclonal antibody. In some embodiments, the drug delivery device may contain or be used with AMG 506 or another product containing a multi-specific FAP×4-1BB-targeting DARPin® biologic under investigation as a treatment for solid tumors. In some embodiments, the drug delivery device may contain or be used with AMG 509 or another product containing a bivalent T-cell engager and is designed using XmAb® 2+1 technology. In some embodiments, the drug delivery device may contain or be used with AMG 562 or another product containing a half-life extended (HLE) CD19×CD3 BiTE® (bispecific T cell engager) construct. In some embodiments, the drug delivery device may contain or be used with Efavaleukin alfa (formerly AMG 592) or another product containing an IL-2 mutein Fc fusion protein. In some embodiments, the drug delivery device may contain or be used with AMG 596 or another product containing a CD3× epidermal growth factor receptor vIII (EGFRvIII) BiTE® (bispecific T cell engager) molecule. In some embodiments, the drug delivery device may contain or be used with AMG 673 or another product containing a half-life extended (HLE) anti-CD33×anti-CD3 BiTE® (bispecific T cell engager) construct. In some embodiments, the drug delivery device may contain or be used with AMG 701 or another product containing a half-life extended (HLE) anti-B-cell maturation antigen (BCMA)×anti-CD3 BiTE® (bispecific T cell engager) construct. In some embodiments, the drug delivery device may contain or be used with AMG 757 or another product containing a half-life extended (HLE) anti-delta-like ligand 3 (DLL3)×anti-CD3 BiTE® (bispecific T cell engager) construct. In some embodiments, the drug delivery device may contain or be used with AMG 910 or another product containing a half-life extended (HLE) epithelial cell tight junction protein claudin 18.2×CD3 BiTE® (bispecific T cell engager) construct.

Although the drug delivery devices, assemblies, components, subsystems and methods have been described in terms of exemplary embodiments, they are not limited thereto. The detailed description is to be construed as exemplary only and does not describe every possible embodiment of the present disclosure. Numerous alternative embodiments could be implemented, using either current technology or technology developed after the filing date of this patent that would still fall within the scope of the claims defining the invention(s) disclosed herein.

Those skilled in the art will recognize that a wide variety of modifications, alterations, and combinations can be made with respect to the above described embodiments without departing from the spirit and scope of the invention(s) disclosed herein, and that such modifications, alterations, and combinations are to be viewed as being within the ambit of the inventive concept(s).

What is claimed is:

1. A drug product reconstitution processing system comprising:
    a drug vial tray . . .
    a first robotic arm . . . including . . . a drug vial transfer system . . . and a vial agitation system . . .
    a second robotic arm . . . the second robotic arm including a needle and a drug vial reconstitution system adapted to selectively add a fluid to the drug vial and/or remove a fluid from the drug vial via the needle; and a collision detection system adapted to identify whether the first robotic arm may contact the second robotic arm in response to a command to move the first robotic arm or the second robotic arm,
    wherein the collision detection system is adapted to cause a controlled movement of the entirety of the first robotic arm and the grasping member as a unit or the entirety of the second robotic arm and the needle as a unit along a coordinated path in generally opposite directions within the defined mechanical constraints and motion parameters of the system in response to identifying that the first robotic arm may contact the second robotic arm while maintaining concurrent operation of the vial agitation system and the drug vial reconstitution system.

2. The drug product reconstitution processing system of claim 1, wherein the agitation system comprises at least one motor, a memory configured to store non-transitory computer executable instructions, and a processor configured to interface with the memory, wherein the processor is configured to execute the non-transitory computer executable instructions to cause the processor to initiate the at least one motor to move according to an agitation routine.

3. The drug product reconstitution processing system of claim 2, wherein the agitation routine comprises moving the drug vial in a lateral direction, moving the drug vial in an axial direction, and rotating the drug vial about an axis.

4. The drug product reconstitution processing system of claim 1, wherein the drug transfer system comprises at least one motor, a memory configured to store non-transitory computer executable instructions, and a processor configured to interface with the memory, wherein the processor is configured to execute the non-transitory computer executable instructions to cause the processor to initiate the at least one motor to move to transfer the drug vial to a different one of the plurality of wells.

5. The drug product reconstitution processing system of claim 1, wherein the collision detection system is adapted to compare a desired movement location of the first robotic arm or the second robotic arm with a location of the second robotic arm or the first robotic arm, respectively.

6. The drug product reconstitution processing system of claim 1, wherein the vial agitation system and the drug vial reconstitution system may operate concurrently.

7. A drug product reconstitution processing system comprising:
    a drug vial tray . . .
    a first robotic arm . . . including a grasping member, a drug vial transfer system . . . , and a vial agitation system . . .
    a second robotic arm . . . the second robotic arm including a needle and a drug vial reconstitution system adapted to selectively add a fluid to the drug vial and/or remove a fluid from the drug vial via the needle;
    a memory . . . and a processor . . . the processor is adapted to execute the non-transitory computer executable instructions to cause the processor to initiate a collision detection system adapted to identify whether the first robotic arm may contact the second robotic arm in response to a command to move the first robotic arm or the second robotic arm,
    wherein the collision detection system is adapted to cause a controlled movement of the entirety of the first robotic arm and the grasping member as a unit or the entirety of the second robotic arm and the needle as a unit along a coordinated path in generally opposite directions in response to identifying that the first robotic arm may contact the second robotic arm while maintaining concurrent operation of the vial agitation system and the drug vial reconstitution system.

8. The drug product reconstitution processing system of claim 7, wherein the collision detection system is adapted to compare a desired well location of the first robotic arm or the second robotic arm with a location of the second robotic arm or the first robotic arm, respectively.

9. The drug product reconstitution processing system of claim 8, wherein the collision detection system applies a distance buffer to the compared desired movement location of the first robotic arm or the second robotic arm with a location of the second robotic arm or the first robotic arm, respectively.

10. The drug product reconstitution processing system of claim 7, wherein the vial agitation system includes at least one motor, wherein the processor is configured to execute the non-transitory computer executable instructions to cause the processor to initiate the at least one motor to move according to an agitation routine.

11. The drug product reconstitution processing system of claim 10, wherein the agitation routine comprises moving the drug vial in a lateral direction, moving the drug vial in an axial direction, and rotating the drug vial about an axis.

12. A computer-implemented method, carried out by an automated drug product reconstitution processing system, for reconstituting a drug product comprising:

receiving . . . an instruction to execute a command;

receiving . . . location data corresponding to a location of a first robotic arm including a grasping member and a vial agitation system coupled therewith, a second robotic arm including a needle and a drug vial reconstitution system coupled therewith, and a desired location of the first robotic arm or the second robotic arm based on the received command;

determining, by a collision detection system of the automated drug reconstitution product processing system, automatically from the set of location data, whether the first robotic arm may contact the second robotic arm upon executing the command; and in response to determining whether the first robotic arm may contact the second robotic arm upon executing the command, selectively executing the command or initiating a collision avoidance routine to cause a controlled movement of the entirety of the first robotic arm and the grasping member as a unit or the entirety of the second robotic arm and the needle as a unit along a coordinated path in generally opposite directions while maintaining concurrent operation of the vial agitation system and the drug vial reconstitution system.

13. The computer-implemented method of claim 12, wherein the step of determining further comprises applying a distance buffer to the compared desired movement location of the first robotic arm or the second robotic arm with a location of the second robotic arm or the first robotic arm, respectively.

14. The computer-implemented method of claim 12, wherein the command comprises at least one of initiating a drug vial transfer system, initiating a drug vial agitation system, or initiating a drug vial reconstitution system.

* * * * *